(12) United States Patent
Kansal

(10) Patent No.: US 11,586,608 B1
(45) Date of Patent: Feb. 21, 2023

(54) HANDLING REQUESTS TO ACCESS SEPARATELY STORED ITEMS IN A NON-RELATIONAL DATABASE

(71) Applicant: Amazon Technologies, Inc., Seattle, WA (US)

(72) Inventor: Yogesh Kansal, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 98 days.

(21) Appl. No.: 16/909,944

(22) Filed: Jun. 23, 2020

(51) Int. Cl.
*G06F 16/23* (2019.01)
*G06F 16/2455* (2019.01)
*G06F 16/22* (2019.01)

(52) U.S. Cl.
CPC ...... *G06F 16/2365* (2019.01); *G06F 16/2282* (2019.01); *G06F 16/2379* (2019.01); *G06F 16/2455* (2019.01)

(58) Field of Classification Search
CPC ............. G06F 16/2365; G06F 16/2282; G06F 16/2379; G06F 16/2455
See application file for complete search history.

(56) References Cited

U.S. PATENT DOCUMENTS

| | | | |
|---|---|---|---|
| 5,943,666 A | 8/1999 | Kleewein et al. | |
| 6,105,017 A | 8/2000 | Kleewein et al. | |
| 6,289,334 B1 | 9/2001 | Reiner et al. | |
| 6,434,544 B1 | 8/2002 | Bakalash et al. | |
| 6,615,203 B1 | 9/2003 | Lin et al. | |
| 7,315,849 B2 | 1/2008 | Bakalash et al. | |
| 7,469,241 B2 | 12/2008 | Bellamkonda et al. | |
| 7,877,381 B2 | 1/2011 | Ewen et al. | |
| 7,908,242 B1 | 3/2011 | Achanta | |
| 7,984,043 B1 | 7/2011 | Waas | |
| 8,005,854 B2 | 8/2011 | Chawla et al. | |
| 8,122,008 B2 | 2/2012 | Li et al. | |
| 8,447,757 B1 | 5/2013 | Cox | |
| 8,838,596 B2 | 9/2014 | Li | |
| 9,633,076 B1 | 4/2017 | Morton et al. | |
| 9,898,475 B1* | 2/2018 | Tiwari | H05K 999/99 |
| 10,067,678 B1 | 9/2018 | Pandis et al. | |
| 10,528,599 B1 | 1/2020 | Pandis et al. | |
| 2006/0167865 A1 | 7/2006 | Andrei | |
| 2012/0331126 A1 | 12/2012 | Abdul-Razzak et al. | |
| 2013/0058215 A1 | 3/2013 | Koponen et al. | |
| 2013/0151926 A1 | 6/2013 | Leggette et al. | |

(Continued)

OTHER PUBLICATIONS

AmitDiwan, MySQL query to select multiple rows effectively?, pp. 1-4, Dec. 11 (Year: 2019).*

(Continued)

*Primary Examiner* — Albert M Phillips, III
(74) *Attorney, Agent, or Firm* — S. Scott Foster; Kowert, Hood, Munyon, Rankin & Goetzel, P.C.

(57) ABSTRACT

A non-relational database system may handle requests to access separately stored items in different data stores. An access request for an item may be received that is stored in a table of a non-relational database. If the item is determined to be stored at a data store not implemented as part of the non-relational database, then an instruction to access the item may be sent to a query engine that can access the data store. A result from the second query engine may be used to respond to the access request for the item.

20 Claims, 10 Drawing Sheets

(56) References Cited

U.S. PATENT DOCUMENTS

| | | |
|---|---|---|
| 2013/0205026 A1 | 8/2013 | Ricci |
| 2013/0318068 A1 | 11/2013 | Apte et al. |
| 2014/0012814 A1* | 1/2014 | Bercovici ........... G06F 16/2379 707/636 |
| 2015/0095308 A1 | 4/2015 | Komacker et al. |
| 2015/0379060 A1* | 12/2015 | Levandoski ............ G06F 16/25 707/607 |
| 2016/0055210 A1 | 2/2016 | Beavin et al. |
| 2018/0210959 A1* | 7/2018 | Khandelwal ........ G06F 16/2471 |

OTHER PUBLICATIONS

U.S. Appl. No. 15/389,318, filed Dec. 22, 2016, Ippokratis Pandis, et al.

U.S. Appl. No. 15/382,334, filed Dec. 16, 2016, Ippokratis Pandis, et al.

\* cited by examiner

HANDLING REQUESTS TO ACCESS SEPARATELY STORED ITEMS IN A NON-RELATIONAL DATABASE

BACKGROUND

Database systems manage large amounts of data on behalf of client applications. As the demands upon database system storage continue to increase, different strategies and techniques for extending the capacity and capabilities of existing databases are implemented. Additional storage systems, for instance, may be used to store additional data for database systems.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement handling requests to access separately stored items in a non-relational database. Non-relational database systems offer great flexibility for storing data as tables that can be quickly scaled to meet changes in demand or scaled in size in order store additional data. Over time, some data becomes less salient for quick access times that a non-relational database system can provide. External storage may be implemented, in various embodiments, in order to provide additional storage capacity that may make room to provide continued high performance for other data retained in internal storage of a non-relational database. In order to continue support access to externally stored data, various techniques for handling requests to access separately stored items in a non-relational database may be implemented that do not require a client application to utilize a separate system in order to gain access to externally stored data. In this way, client applications can continue to operate without interruption or modification in order to access separately stored items. Moreover, the performance of the non-relational database system may be improved as more resources can be made available for accessing, managing, or otherwise interacting with items stored within the non-relational database. For example, storage capacity for a table can be increased within a non-relational database system without adding more storage devices. Similarly, processing, network, memory, or other computing resources can be freed to handling a higher workload at the non-relational database system.

Figure 1:
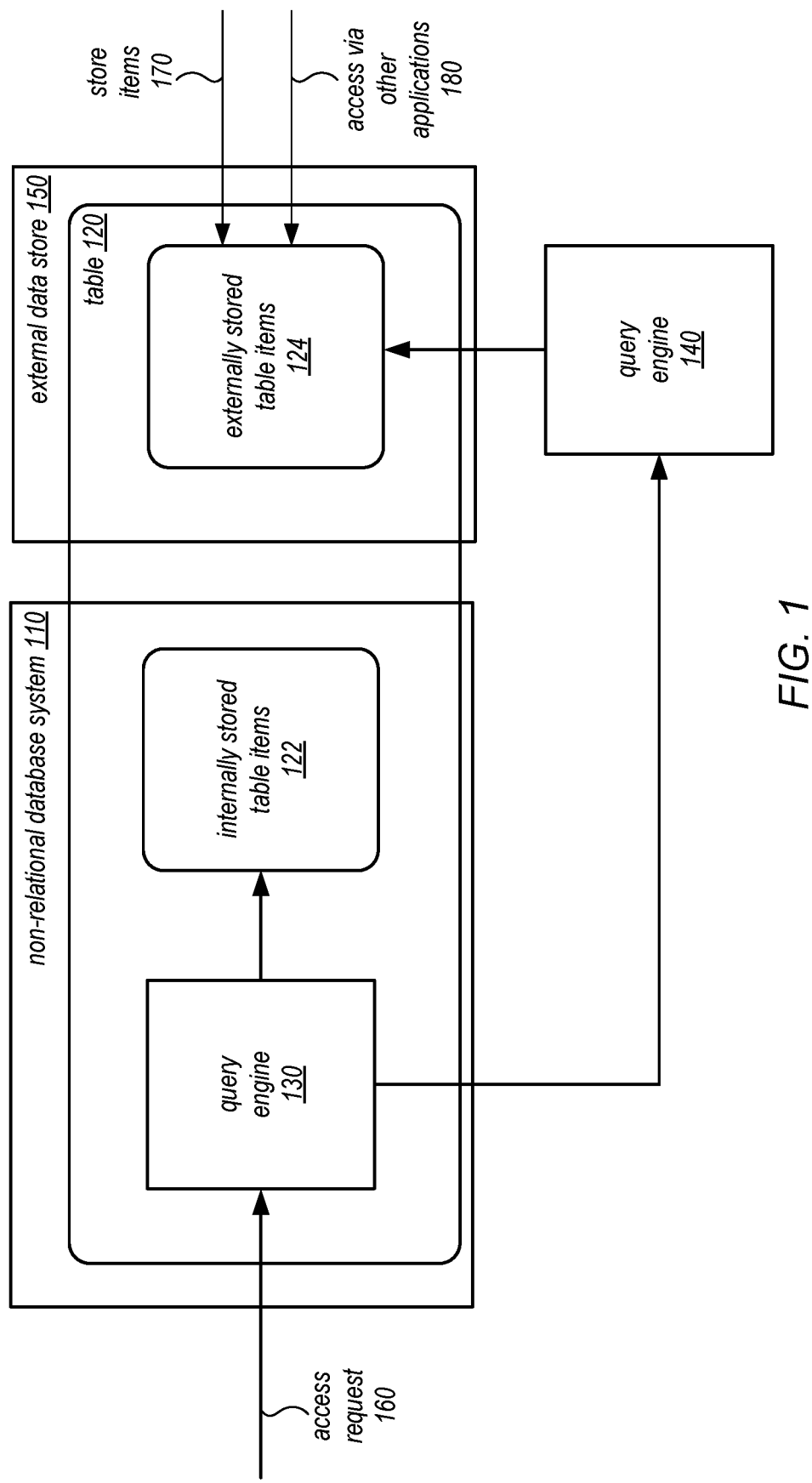
FIG. 1 is a logical block diagram illustrating handling requests to access separately stored items in a non-relational database, according to some embodiments.

FIG. 1 is a logical block diagram illustrating handling requests to access separately stored items in a non-relational database, according to some embodiments. Non-relational database system 110 may manage and store data, such as various items for a table, such as table 120. A non-relational database system 110 may be a data store or system that provides access to a collection of one or more items (e.g., table 120), in various embodiments. In some embodiments, non-relational database system 110 may allow different items stored within the same table to have a different (or no) schema so that, for instance, one item may have different attributes or values than another item.

As illustrated in FIG. 1, some items may be stored internally, as indicated at 122. Other items may be stored externally, as indicated at 124 in external data store 150. As discussed below with regard to FIG. 3, externally stored table items 124 may be items that were initially stored in internally in non-relational database system 110 and then moved to external data store 150. In some embodiments, items 124 may be stored directly to external data store 150, as indicated 170, which may bypass non-relational database system 110. In some embodiments, externally stored table items 124 may be stored in a different format, schema, or arrangement than internally stored table items 122 (e.g., in column-oriented fashion whereas internally stored items 122 may be stored in row-oriented fashion).

External data store 150 may not be directly accessible (or natively accessible) to query engine 130 which handles requests to table 120 for non-relational database system 110, in various embodiments. Thus when an access request 160 directed to an item in table 120 is received, query engine 130 can determine whether the item is stored internally at 122 or externally at 124. For externally stored items in the table, query engine 130 can send a request to query engine 140, which can access externally stored table items in external data store 150. Query engine 140 may support additional or different operations than query engine 130. Thus, query engine 130 can support additional analyses (or take advantage of the additional operations) to provide further features to clients without breaking the existing interface for access requests 160), in some embodiments. Moreover, in some embodiments, query engine 140 can support different storage formats or schemas in which external stored table items

124 are stored. Such embodiments may also allow for other applications, tools or database systems to access externally stored table items 124, as indicated at 180.

Please note that previous descriptions of a non-relational database system, table, and external data store are not intended to be limiting, but are merely provided as logical examples.

This specification begins with a general description of a provider network that may implement a database service that may implement handling requests to access separately stored items in a non-relational database. Then various examples of a database service are discussed, including different components/modules, or arrangements of components/module, that may be employed as part of implementing the database service, in some embodiments. A number of different methods and techniques to implement handling requests to access separately stored items in a non-relational database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
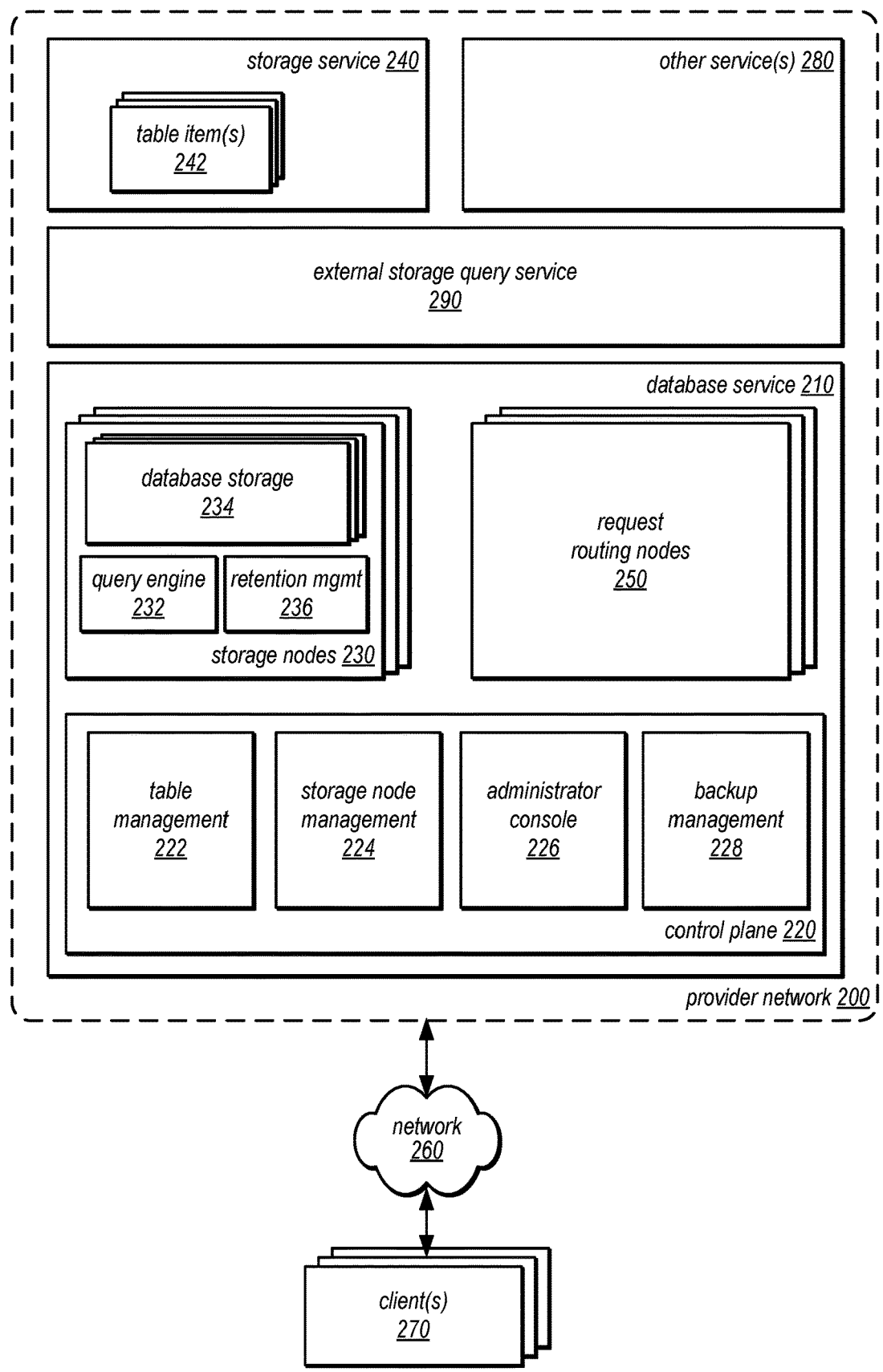
FIG. 2 is a logical block diagram illustrating a provider network offering a database service that may implement handling requests to access separately stored items in a non-relational database, according to some embodiments.

FIG. 2 is a logical block diagram illustrating a provider network offering a database service that may implement handling requests to access separately stored items in a non-relational database, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as database service 210 (e.g., a non-relational (NoSQL) database may utilize collections of items (e.g., tables that include items)), and other services (not illustrated), storage service(s) 240 (e.g., an object storage service, block-based storage service, or data storage service that may store different types of data for centralized access), or other service(s) 290, such as virtual compute services, and/or any other type of network-based services (which may include various other types of storage, processing, analysis, communication, event handling, visualization, and security services). In some embodiments, external storage query service 290 may be implemented, as discussed in detail below with regard to FIGS. 5 and 6.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may be implemented various types of distributed database services, in some embodiments, for storing, accessing, and updating data in tables hosted in a non-relational database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console 226) or a programmatic interface to the database system. In some embodiments, database service 210 may provide a RESTful programmatic interface in order to submit access requests (e.g., to get, insert, delete, or scan data).

In some embodiments, clients 270 may encompass any type of client configurable to submit network-based requests to provider network 200 via network 260, including requests for database service 210 (e.g., to access item(s) in a table in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client(s) 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments. In some embodiments, request routing nodes 250 may determine whether to route requests to internally stored data (e.g., at storage nodes 230) and/or to externally stored data (e.g., table item(s) 242) in storage service 240) via external storage query service 290, as discussed below with regard to FIG. 4B.

In some embodiments, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiments. Admin console 226 may allow system administrators to interact directly with database service 210 (and/ or the underlying system). In some embodiments, the admin console 226 may be the primary point of visibility and control for database service 210 (e.g., for configuration or reconfiguration by system administrators). For example, the admin console 226 may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with processing nodes to initiate the performance of various control plane operations, such as moves of multi-table partitions, splits of multi-table partitions, update tables, delete tables, create indexes, etc. . . . In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each table partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Because tables may be stored in one or multiple partitions, resource allocation for a table to be created may be avoided as tables may be updated to handle additional data according to storage node management 224 (e.g., by adding new partitions), or other partition management features, in some embodiments. Backup management 228 may handle the creation of backup requests to make copies as of a version or point-in-time of a database, as backup partitions 242 in storage service 240.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement query engine 232, in some embodiments. Query engine 232 may perform various operations (e.g., read/get, write/update/modify/change, insert/add, or delete/remove) to access individual items stored in tables in database service 210, in some embodiments. In some embodiments, query engine 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments query engine 232 may maintain database partitions according to a database model (e.g., a non-relational, NoSQL, or other database model (e.g., key-value)). As discussed in detail below with regard to FIGS. 4A and 7-8, query engine 232 may handle requests to separately stored items, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no predefined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store backups. Storage service 240 may implement striping, sharding, or other data distribution techniques so that different portions of a table item(s) 242 are stored across multiple locations (e.g., at separate nodes). In some embodiments, retention management 236 may be implemented as part of storage nodes 230, discussed in detail below with regard to FIG. 3. Retention management 236 may store or move items from database storage 234 to be stored as table items 242 in storage service 240.

Figure 3:
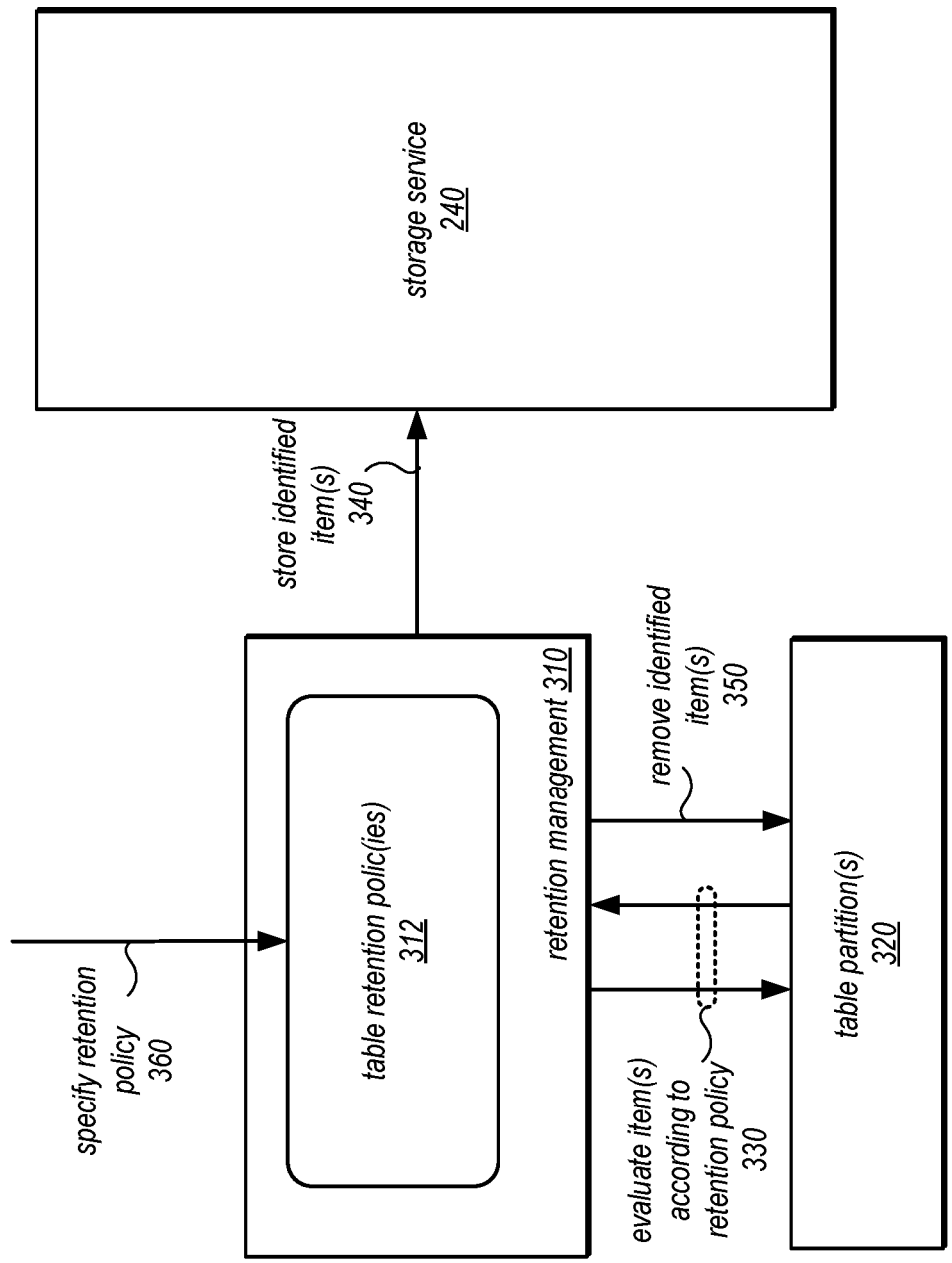
FIG. 3 is a logical block diagram illustrating moving items from internal storage of a database service to external storage, according to some embodiments.

FIG. 3 is a logical block diagram illustrating moving items from internal storage of a database service to external storage, according to some embodiments. Retention management 310 (which may be similar to retention management 236 in FIG. 2) may be implemented to move items in accordance with table retention polic(ies) 312. For example, retention management 310 may support requests to specify retention policies 312, as indicated at 360, which may be submitted through the various interface(s) supported by database service 210 (e.g., administrator console 226, API, etc.). Retention management 310 may scan, read, or otherwise evaluate item(s) according to a retention, policy as indicated at 330. For example, table partition(s) 320 may be scanned for items with a timestamp indicating a last time updated or accessed that exceeds a retention time threshold, which can identify whether items should be moved to external storage.

Retention management 310 may store items identified for movement, as indicated at 340, into storage service 240, in some embodiments. For example, retention management 310 may submit requests according to the interface of storage service 240 (e.g., put items as objects in a folder, collection, or bucket for a table with a key value that corresponds to a key value of the items in table partition(s) 320). Note that a same partition of a table can be divided into different storage locations, in some scenarios, where some items are stored in the internal storage and other items are stored externally (e.g., in storage service 240). Retention management 310 may also remove identified item(s) 350 from internal storage from table partition(s) 320 (e.g., from database storage 234).

Figure 4A:
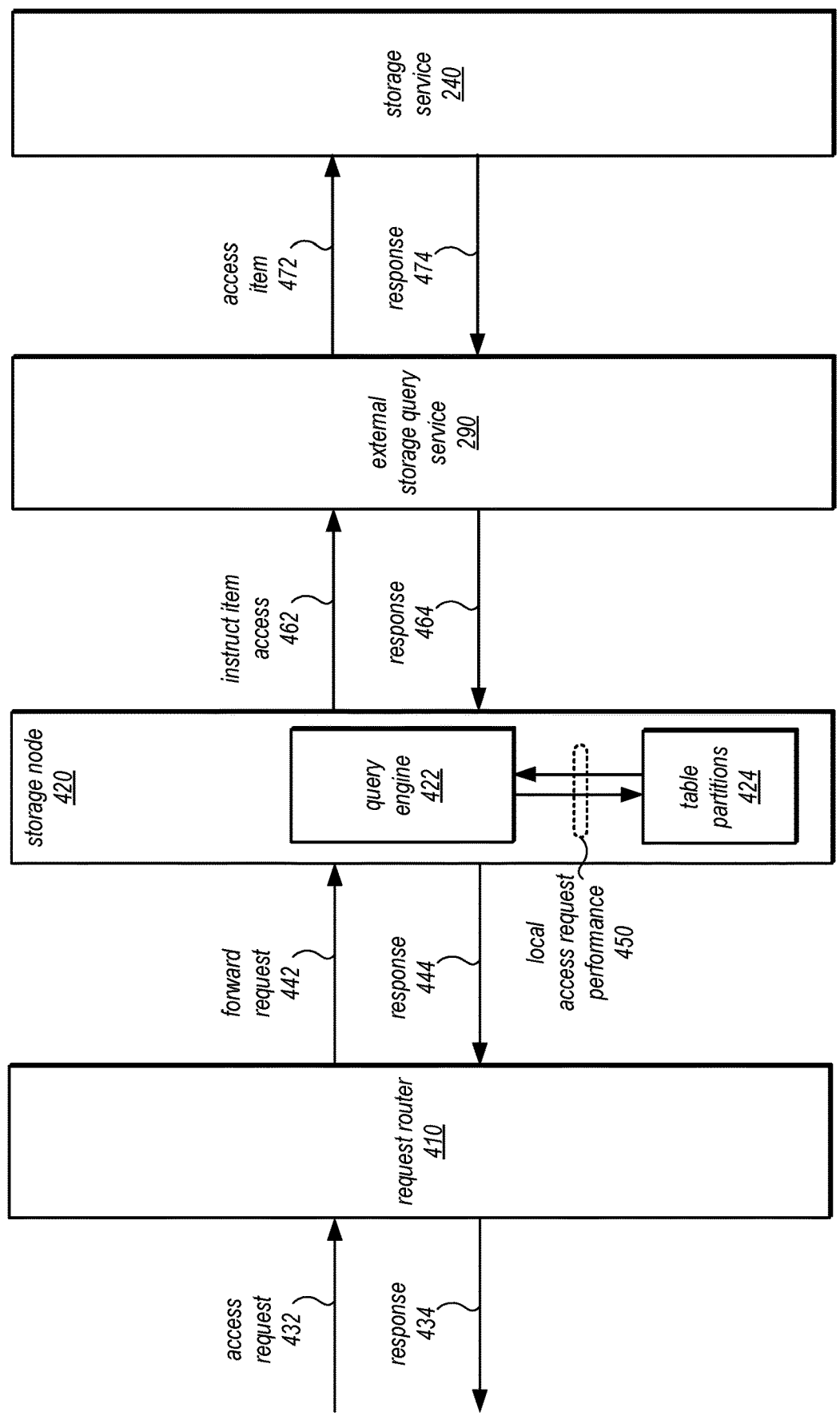
FIGS. 4A-4B are logical block diagrams illustrating request handling, according to some embodiments.
Figure 4B:
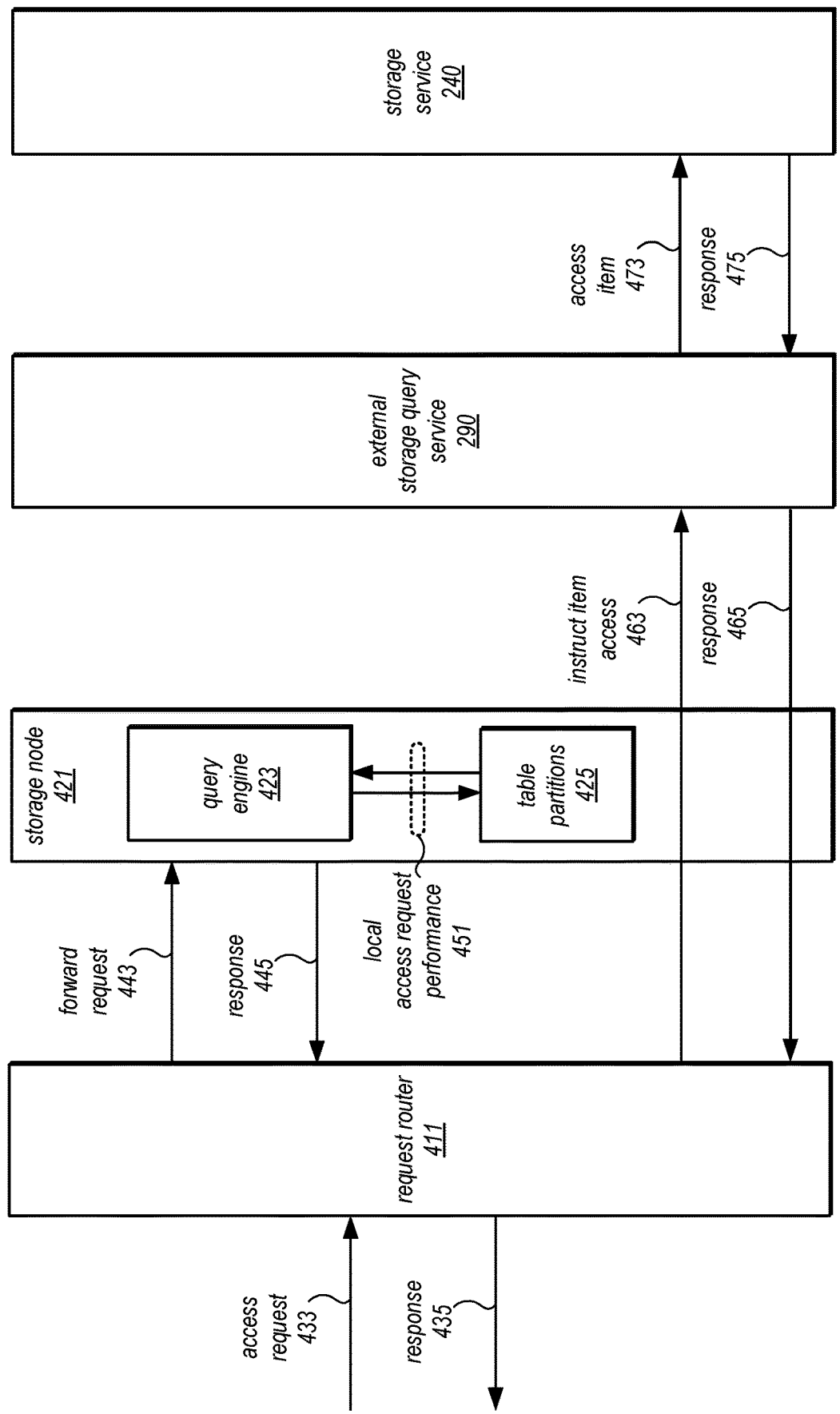

FIGS. 4A-4B are logical block diagrams illustrating request handling, according to some embodiments. In FIG. 4A, a storage node is described as handling both requests for internally stored and externally stored items of a table. For example, as indicated at 432, an access request (e.g., a request to read, write, get, modify, query, scan, etc.) an item of table stored in database service 210. Request router 410 may forward 442 the request to the storage node 420 with the table partition 424 that should include the item. Query engine 422 may determine the location that should be read to handle the request. For example, as discussed below with regard to FIG. 7, a bloom filter may be used to determine whether the item is external or local. In some embodiments, other mapping information (e.g., an index) may be implemented that identifies whether items are stored locally or externally. For local items, a local access request performance 450 to table partitions 424 may be used to respond 442 to request router 410 which may send the response 434.

For externally stored items, query engine 422 may send an instruction item access 462 to external storage query service 290. As discussed in detail below with regard to FIG. 5, external storage query service 290 may access the item, as indicated at 472 in storage service 240. The response 474 may be used to provide a response 464 to storage node 420. Storage node 420 may then respond 442 to request router 410 which may send the response 434. In some embodiments, access requests 432 may cause lookups to both internally stored and externally stored items. Request router 410 may, in such cases, combine data obtained from storage service 240 (by store node 420 instructing access to external storage query service 290) and data obtained from storage node 420 (e.g., from table partitions 424).

In FIG. 4B, a storage node is described as handling requests for internally stored items of a table and a request router is described as handling requests for externally stored items of a table. For example, as indicated at 433, an access request (e.g., a request to read, write, get, modify, query, scan, etc.) an item of table stored in database service 210. Request router 411 may forward 443 the request to the storage node 421 with the table partition 425 that should include the item. Query engine 423 may perform a local access request performance 451 to table partitions 425 in order to respond 443 to request router 411 which may send the response 435.

Request router 411 may determine the location that should be read to handle the request. For example, as discussed below with regard to FIG. 7, a bloom filter may be used to determine whether the item is external or local. In some embodiments, other mapping information (e.g., an index) may be implemented that identifies whether items are stored locally or externally. For externally stored items, request router 411 may send an instruction item access 463 to external storage query service 290. As discussed in detail below with regard to FIG. 5, external storage query service 290 may access the item, as indicated at 473 in storage service 240. The response 475 may be used to provide a response 465 to request router 411. Request router 411 may then respond 435 to the access request 433. As noted above, in some embodiments, access requests 433 may cause lookups to both internally stored and externally stored items. Request router 411 may, in such cases, combine data obtained from storage service 240 (by store node 420 instructing access to external storage query service 290) and data obtained from storage node 421 (e.g., from table partitions 425).

Figure 5:
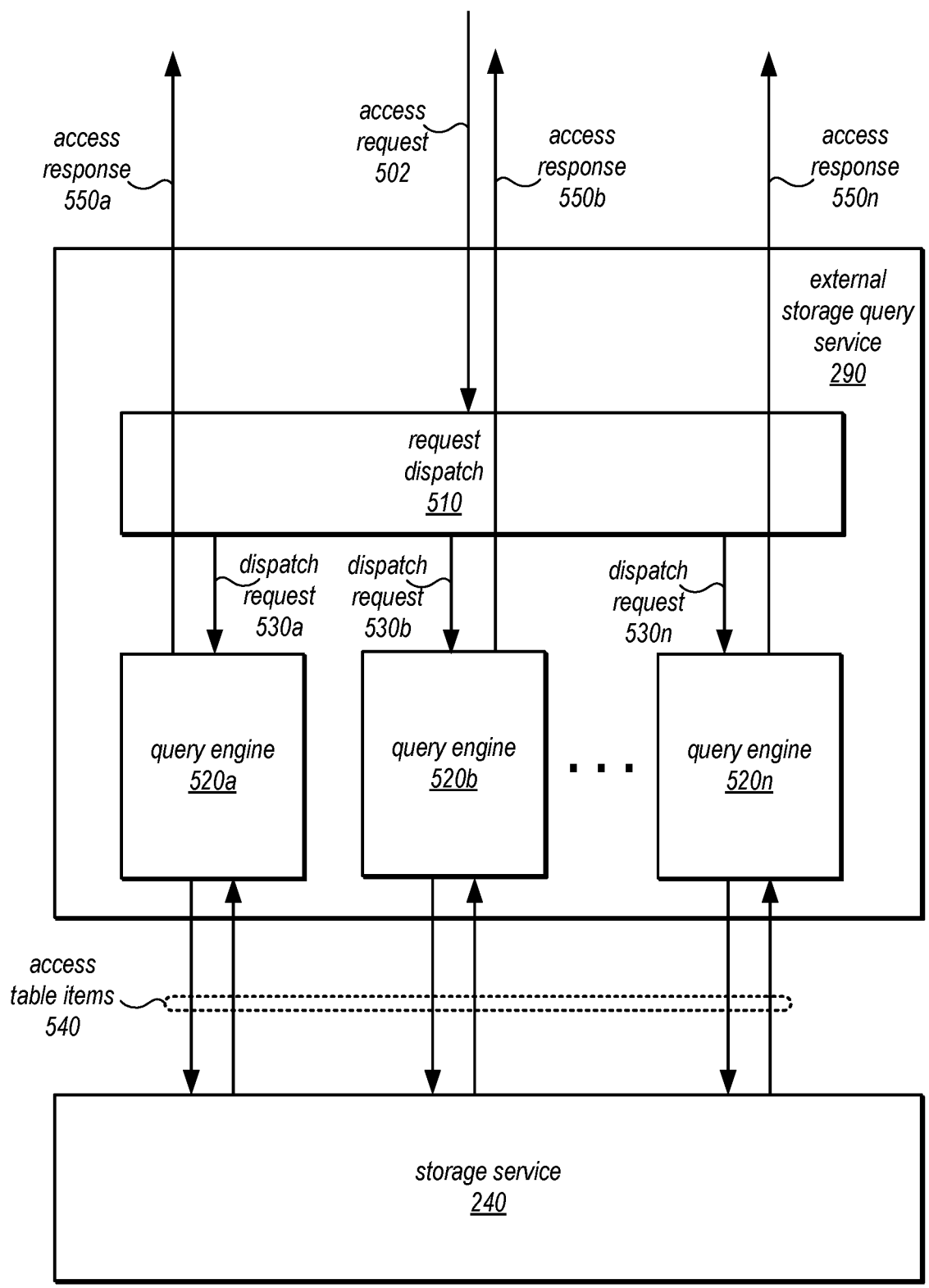
FIG. 5 is a logical block diagram illustrating an external storage query service that handles access requests for externally stored items, according to some embodiments.

FIG. 5 is a logical block diagram illustrating an external storage query service that handles access requests for externally stored items, according to some embodiments. External storage query service 290 may be implemented as a stateless service, in some embodiments, so that no individual query node is dedicated to a particular client or preserves data beyond the performance of a single request. For example, a query engine 520*a* may not persistently store table metadata or other information for table items that are accessed (e.g., as indicated at 540). Instead, when a request is dispatched, as indicated at 530*a*, metadata describing the table may be obtained (e.g., from a metadata store) or determined (e.g., from data stored with the table items in storage service 240 or from analyzing table items stored in storage service 240). In this way, query engines 520 can handle different requests for different tables hosted by database system 210.

External storage query service 290 may receive an access request 502 at a network front-end, which may implement request dispatch 510. Request dispatch 510 may load balance (e.g., using round-robin or other load balancing schemes) and send requests to one of a fleet of query engines, such as query engine 520*a*, 520*b*, and 520*n*, as indicated at 530*a*, 530*b*, and 530*n*, in some embodiments. In some embodiments, request dispatch 510 may add or provide information along with dispatching requests (e.g. access credentials, table metadata, etc.) in order for query engines 520 to perform the requested access.

Query engines 520 may then perform the operations to access table items 540 in storage service 240. For example, query engine 520 may support various types of data formats (e.g., relational, non-relational, etc.) and be able to parse, analyze and respond to a request 502. In some embodiments, query engines 520 may support types of operations not supported by database service 210 query engines 224 (e.g., SQL requests, aggregations, or other operations). In at least some embodiments, database service 210 may add interface commands or requests that support invoking some of these operations, which may then be forwarded to external storage query service 290 for performance. In some embodiments, query engines 520 may be individual implementations of distributed data processing systems (e.g., clusters of multiple nodes). Query engines 520 may then provide respective responses, as indicated at 550*a*, 550*b*, and 550*n* to access requests.

Figure 6:
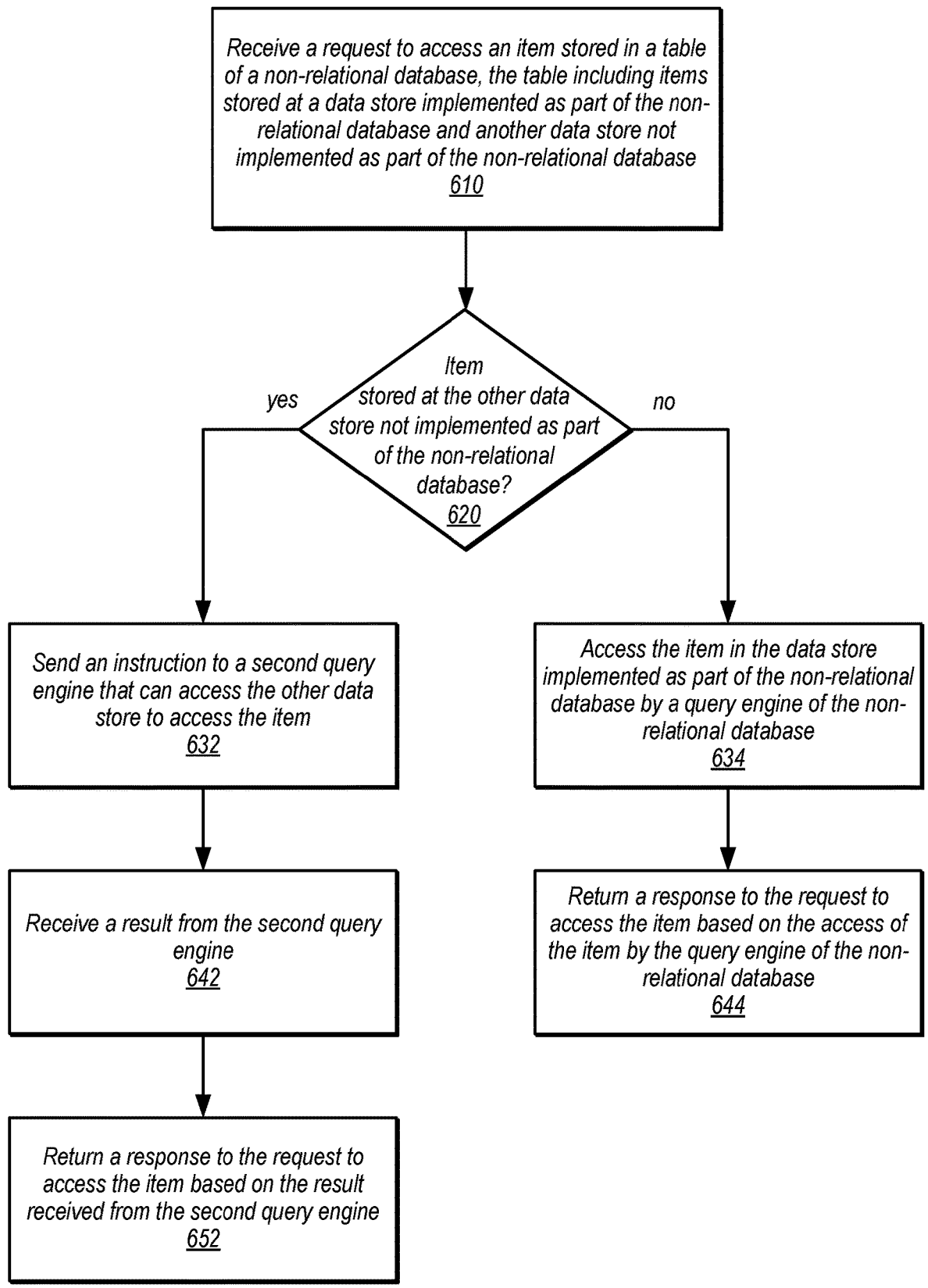
FIG. 6 is a high-level flowchart illustrating various methods and techniques to implement handling requests to access separately stored items in a non-relational database, according to some embodiments.

The examples of a database that implements handling requests to access separately stored items in a non-relational database as discussed in FIGS. 2-5 above have been given in regard to a non-relational database service (e.g., document database, NoSQL database, etc.). However, various other types of non-relational database systems can advantageously implement handling requests to access separately stored items, in other embodiments. FIG. 6 is a high-level flowchart illustrating various methods and techniques to implement handling requests to access separately stored items in a non-relational database, according to some embodiments. These techniques, as well as the techniques discussed with regard to FIGS. 7-8, may be implemented using components or systems as described above with regard to FIGS. 2-5, as well as other types of databases or storage systems, and thus the following discussion is not intended to be limiting as to the other types of systems that may implement the described techniques.

As indicated at 610, a request to access an item stored in a table of a non-relational database may be received, in some embodiments. The table, as discussed above with regard to FIG. 1, may store items in either (or both) a data store implemented as part of the non-relational database system or separately implemented, external to the non-relational database system. Various types of access requests, such as requests that cause reads of the item, including get, read, fetch, scan or query, may be received. In some embodiments, writes or other modifications to the item may be received as access requests. In some embodiments, access requests may be received that combine, join, or use data from both external and internal storage. As indicated at 620, a determination may be made as to whether the item is stored at the other data store that is external to and not implemented as part of the non-relational database, in some embodiments. For example, an index or other mapping information may identify storage locations for individual items. In some embodiments, a bloom filter may be used, as discussed in detail below with regard to FIGS. 7 and 8. In some embodiments, requests to both internal and external storage may be performed (not illustrated) for an item if the item is determined to be at external storage. In this way, the item may be returned faster if present in internal storage.

As indicated at 632, for those requests that are stored at the other data store not implemented as part of the non-relational database, an instruction to a second query engine may be sent that can access the other data store to access the item, in some embodiments. For example, an instruction may be generated in a different protocol, API, language, or other format than the received access request (e.g., in a SQL statement), which may then be sent to a query engine directly (or to a network endpoint that dispatches the request to one of a plurality of query engines that can access the other data store). As indicated at 642, a result may be received from the second query engine, in some embodiments. The result may be an acknowledgement (e.g., of a modification or other write to the item). In some embodiments, the result may be the item values requested or otherwise read from the item. As indicated at 652, a response to the request to access the item may be returned based on the result received from the second query engine, in some embodiments.

As indicated at 634, for those requests that are stored in the data store implemented as part of the non-relational database, a query engine implemented as part of the non-relational database may access the item, in some embodiments. As indicated at 644, a response to the request to access the item based on the access of the item by the query engine may be returned, in some embodiments.

Figure 7:
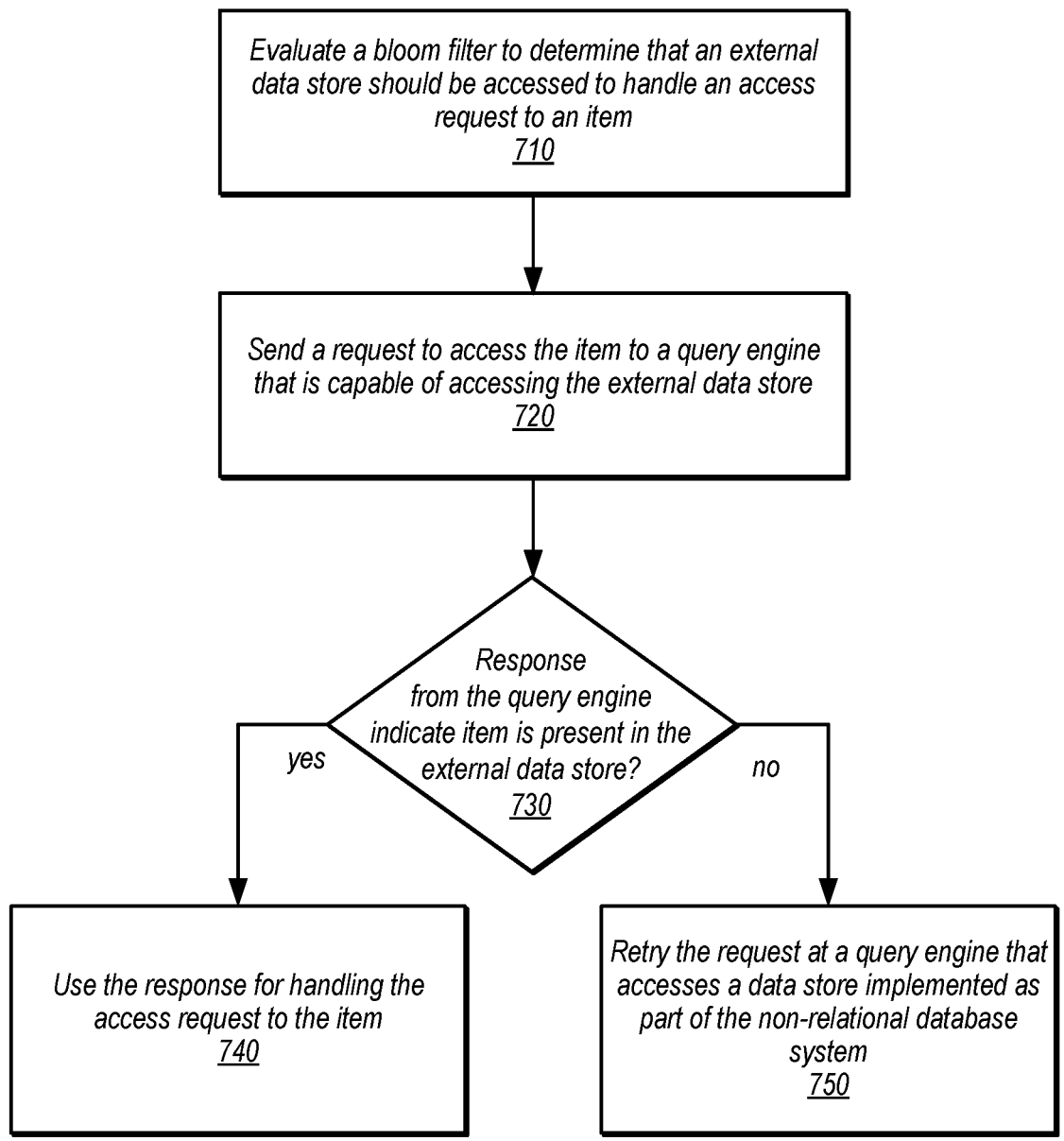
FIG. 7 is a high-level flowchart illustrating various methods and techniques to determine what data store to access to handle a request, according to some embodiments.

Different types of mapping or other information may be used to determine the storage location to use to handle an access request. A bloom filter (or other probabilistic data structure) may provide space efficient mapping for tables with very large numbers of items. FIG. 7 is a high-level flowchart illustrating various methods and techniques to determine what data store to access to handle a request, according to some embodiments. As indicated at 710, a bloom filter may be evaluated to determine that an external data store should be accessed to handle an access request to an item, in some embodiments. For example, one or more hash functions may be applied to an attribute of the item (e.g., a key value or other identifier), the output of the hash functions may identify locations in a bit array that should each be set to "1" in order to indicate that the item is likely stored in the external data store.

As indicated at 720, a request may be sent to a query engine to access the item that is capable of accessing the external data store, in some embodiments. A response may be received from the request, in some embodiments, as indicated at 730. The response may indicate whether (or not) the item is present in the external data store, in some embodiments. For example, the item may be returned, indicating that the item is present. If the item is not present, then an error message or empty set may be returned, in some embodiments. If the item is present, then the response received from the query engine may be used to handle the access request to the item, as indicated at 740, in some embodiments. If the item is not present (as a bloom filter may provide a false positive), then as indicated at 750, the request may be retried at a query engine that accesses a data store implemented as part of the non-relational database system, in some embodiments. The result of that request may then be used for handling the item instead. In some embodiments, as noted above, a request for an item identified as present in the external data store may also be performed internally too so that if the request happens to not be externally stored (e.g., a false positive scenario), then the internal request may complete (or fail if no such item exists).

Figure 8:
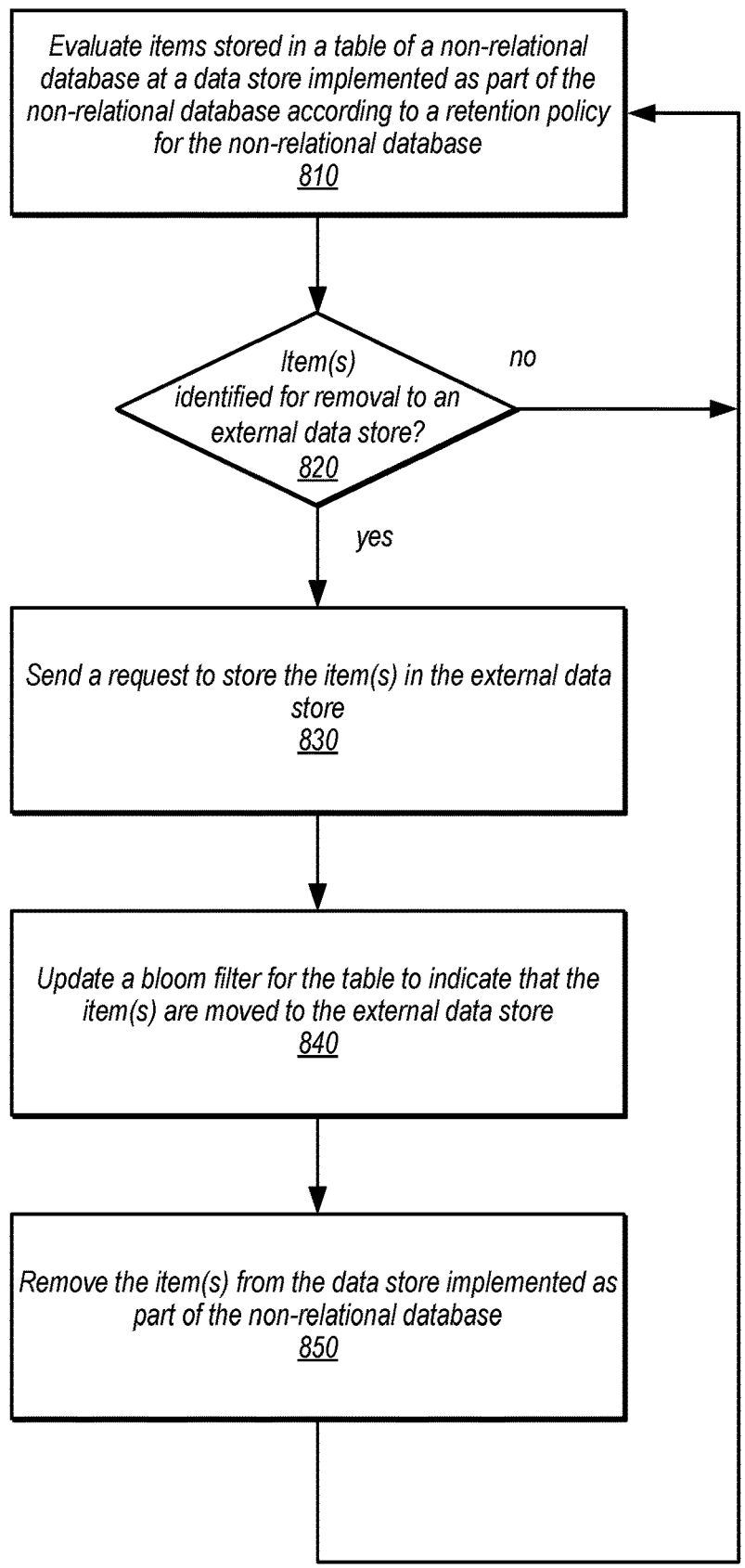
FIG. 8 is a high-level flowchart illustrating various methods and techniques to apply a retention policy for items in a non-relational database, according to some embodiments.

Storing items of a table in a non-relational database in different locations offers many advantages. Other systems (different than the query engines discussed above), can initially store, add, modify, remove, or otherwise access items stored in the external storage, in some embodiments. In addition to supporting the access of additional systems, storing items in different locations allow for the efficient selection of storage locations for some types of data. Cold or less frequently accessed data can be stored in cheaper or less performant storage, which may save space for additional items in the more performant storage location, in some embodiments. Retention policies may be applied to determine when to move items from internal, non-relational database system implemented storage to external storage, in some embodiments. FIG. 8 is a high-level flowchart illustrating various methods and techniques to apply a retention policy for items in a non-relational database, according to some embodiments.

As indicated at 810, items stored in a table of a non-relational database stored at a data stored implemented as part of the non-relational database may be evaluated according to a retention policy for the non-relational database, in some embodiments. A retention policy may, for instance, provide the criteria or other instructions for determining when to move data from internal to external storage. For example, a retention policy may be a least-recently accessed style of policy, where items not accessed (e.g., either to read or write to the item) within some threshold time or least among those stored in internal storage may be identified for removal. In some embodiments, a timestamp, date value, or other attribute of the items themselves may indicate if the item should be moved (e.g., items with a month attribute value prior to a current month should be removed).

In some embodiments, item removal may be continuously (or periodically) may be performed, as indicated by the loop from element 820 and 850 back to element 810. If items are identified for removal to an external data store, as indicated by the positive exit from 820, then as indicated at 830, a request may be sent to store the items in the external data store, in some embodiments. The request may be sent directly to the external data store, in some embodiments, by the query engine (e.g., implemented at a storage node or request router), or may be sent to the query engine capable of accessing the external data store, in some embodiments.

As discussed above with regard to FIG. 7, a bloom filter (or some other information that identifies the storage location of items) may be updated to indicate that the item(s) are moved, in some embodiments. For example, the bits in the array of the bloom filter may be set to 1 for an item identifier (e.g., key value) used as the input to hash function(s) that generate the array locations in the bloom filter. As indicated at 850, the item(s) may be removed from the data store implemented as part of the non-relational database, in some embodiments. For example, the items may be marked for deletion and later removed by a background cleanup operation. In some embodiments, the items may be explicitly removed when identified. In some embodiments, the items may be retained (not illustrated).

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
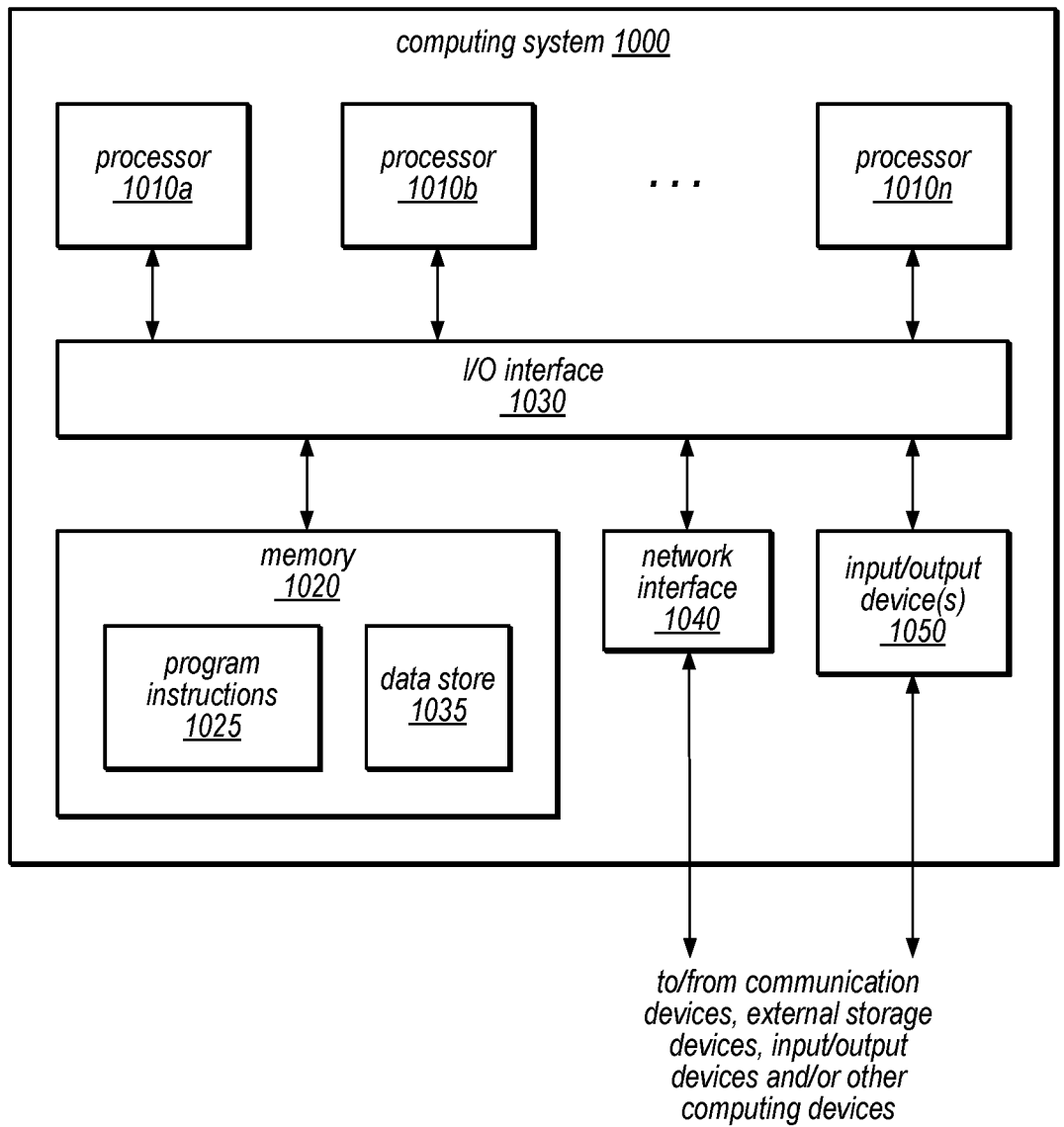
FIG. 9 is a block diagram illustrating an example computing system, according to some embodiments.

Embodiments to implement handling requests to access separately stored items in a non-relational database as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement handling requests to access separately stored items in a non-relational database, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or notebook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a non-relational database system comprising a first query engine and a first data store;
   wherein the non-relational database system provides client access to a table, wherein the table comprises a plurality of items, wherein a first one of the plurality of items is stored in the first data store, wherein the first data store is directly accessible by the first query engine, wherein a second one of the plurality of items is stored in a second data store, wherein the second data store is implemented external to the non-relational database system and is not directly accessible by the first query engine;
   wherein the non-relational database system is configured to:
      receive, at the first query engine, a request to access an item stored in the table;
      determine, by the first query engine, that the item of the access request is the second item stored in the second data store;
      send, by the first query engine, an instruction to a second query engine with direct access to the second data store to access the item in the second data store;
      receive, at the first query engine, a result from the second query engine; and
      return, by the first query engine, a response to the request to access the item based on the result received from the second query engine.

2. The system of claim 1, wherein to determine that the item of the access request is stored in the second data store, the non-relational database system is configured to evaluate a bloom filter to determine that the second data store should be accessed to handle the request to access the item.

3. The system of claim 2, wherein the non-relational database system is further configured to:
   evaluate those items of the plurality of items stored in the first data store according to a retention policy for the non-relational database system;
   identify one or items for removal to the second data store;
   send a request to store the one or more items in the second data store;
   update the bloom filter to indicate that the one or more items are stored in the second data store; and
   remove the one or more items from the first data store.

4. The system of claim 1, wherein the non-relational database system is a database service implemented as part of a provider network, wherein the second data store is an object storage service implemented as part of the provider network, and wherein the second query engine is hosted on another service of the provider network.

5. A method, comprising:
   receiving a request to access an item stored in a table of a non-relational database system, wherein the non-relational database system provides client access to the table, wherein the table comprises a plurality of items, including the item, wherein a first one of the plurality of items is stored in a first data store for the non-relational database system that is directly accessible by a first query engine, wherein a second one of the plurality of items is stored in a second data store that is implemented external to the non-relational database system and is not directly accessible by the first query engine;

determining that the item of the request is the second item stored in the second data store;

sending an instruction to a second query engine to directly access the item in the table in the second data store;

receiving a result from the second query engine; and returning a response to the request to access the item based on the result received from the second query engine.

6. The method of claim 5, further comprising:

receiving another request to access another item of the table;

determining that the other item stored in the first data store; and accessing, by the first query engine, the other item in the first data store to respond to the request to access the other item of the table.

7. The method of claim 6, wherein the other item and the item are part of a same partition of the table.

8. The method of claim 5, wherein the first query engine is implemented at a request router for the non-relational database that forwards requests for items stored in the first data store to a storage node for the non-relational database.

9. The method of claim 5, further comprising:

evaluating those items of the plurality of items stored in the first data store according to a retention policy for the non-relational database system;

identifying one or items for removal to the second data store; and sending a request to store the one or more items in the second data store.

10. The method of claim 5, wherein the request to access the item is a get item request.

11. The method of claim 5, wherein determining that the item of the access request is stored in the second data store comprises evaluating a bloom filter to determine that the second data store should be accessed to handle the request to access the item.

12. The method of claim 11, wherein the request is also a request to access another item stored in the first store, and wherein the method further comprises:

accessing, by the first query engine, the other item in the first data store to respond to the request based on both the item and the other item.

13. The method of claim 5, wherein the second item stored in the second data store was modified by a system different from the first query engine and the second query engine before the item was accessed by the second query engine.

14. One or more non-transitory, computer-readable storage media, storing program instructions that when executed on or across one or more computing devices cause the one or more computing devices to implement a first query engine of a non-relational database system:

receiving a request to access an item stored in a table of a non-relational database system, wherein the non-relational database system provides client access to the table, wherein the table comprises a plurality of items, including the item wherein a first one of the plurality of items is stored in a first data store for the non-relational database system that is directly accessible by the first query engine, wherein a second one of the plurality of items is stored in a second data store that is implemented external to the non-relational database system and is not directly accessible by the first query engine;

determining that the item of the request is the second item stored in the second data store;

instructing a second query engine to directly access the item in the table in the second data store;

receiving a result from the second query engine; and returning a response to the request to access the item based on the result received from the second query engine.

15. The one or more non-transitory, computer-readable storage media of claim 14, wherein, in determining that the item of the access request is stored in the second data store, the program instructions cause the one or more computing devices to implement evaluating a bloom filter to determine that the second data store should be accessed to handle the request to access the item.

16. The one or more non-transitory, computer-readable storage media of claim 14, storing further instructions that cause the first query engine to further implement:

evaluating those items of the plurality of items stored in the first data store according to a retention policy for the non-relational database system;

identifying one or items for removal to the second data store; and sending a request to store the one or more items in the second data store.

17. The one or more non-transitory, computer-readable storage media of claim 16, storing further instructions that cause the first query engine to further implement removing the one or more items from the first data store.

18. The one or more non-transitory, computer-readable storage media of claim 14, wherein the request to access the item is a query that also causes accesses to one or more other items of the table.

19. The one or more non-transitory, computer-readable storage media of claim 14, wherein the first query engine is implemented at a storage node for the non-relational database that stores a partition that includes the item and wherein the request is received from a request router.

20. The one or more non-transitory, computer-readable storage media of claim 14, wherein the non-relational database system is a database service offered by a provider network, wherein the second data store is an object storage service implemented as part of the provider network, and wherein the second query engine is hosted on another service of the provider network.

* * * * *